Feb. 7, 1933.  F. W. GAY  1,896,356
ELECTRIC POWER GENERATING PLANT
Filed Oct. 25, 1929   2 Sheets-Sheet 1

INVENTOR.
Frazer W. Gay
BY George D. Richards
ATTORNEY.

Feb. 7, 1933. F. W. GAY 1,896,356
ELECTRIC POWER GENERATING PLANT
Filed Oct. 25, 1929  2 Sheets-Sheet 2

INVENTOR.
Frazer W. Gay
BY
George D. Richards
ATTORNEY.

Patented Feb. 7, 1933

1,896,356

UNITED STATES PATENT OFFICE

FRAZER W. GAY, OF NEWARK, NEW JERSEY

ELECTRIC POWER GENERATING PLANT

Application filed October 25, 1929. Serial No. 402,400.

This invention relates, generally, to power plants supplying utility systems; and the invention has reference, more particularly, to a novel electric power generating plant that is adapted to efficiently carry widely varying loads such as those imposed upon a utility system.

Heretofore, when a new generating station is added to a utility system it has been customary to operate the same as a base load station which means that the new station is operated at full load substantially continuously and at its maximum efficiency. However, since utility systems enlarge rapidly, and as the minimum load on such systems is generally on the order of one quarter of the maximum load or even less; it usually follows that after a few years operation as a base load station, such new generating station must gradually be adjusted to serve as a peak load station. When operating as a peak load station it is frequently necessary to start and stop the major part of the station units daily. In order for such station to operate satisfactory as a peak load station it must be initially designed at great additional expense for the highest possible efficiency at all operating loads. Equipment such as boiler blowers, fuel feeders, etc., must be adapted to be varied uniformly from a very low to a high speed. The station must in addition be provided with an expensive control system which will maintain its inherently high efficiency under widely different load conditions. When operating as a peak load station the time of loading is so shortened that the station is idle the greater part of the time, thereby adding greatly to the overhead expense of the utility system.

The principal object of the present invention is to provide a novel generating station and method of operating the same at a minimum capital expense, such that it is adapted to efficiently carry a normal utility system load, which load consists usually of a light night load, a moderately heavy day load and a high peak evening load. Such novel generating station is composed of certain generating units of relatively high capital costs adapted to operate substantially continuously at maximum efficiency and other units adapted to operate for short periods of time which latter units are designed for minimum capital costs rather than efficiency. Such a station when placed in service may be operated on a load cycle similar to that of the system load and its method of operation may remain substantially constant for a generation.

In my application, Serial No. 352,755, filed April 5, 1929, it was shown how heat energy may be stored in heated water during periods of light load and how this stored heat energy may be made available during heavy load periods by pumping the stored water to boilers as feed water, thereby rendering it unnecessary to draw steam from the boilers during heavy load periods to heat feed water.

Heretofore, it has been impossible to employ large storage reservoirs owing to the practice of storing at constantly changing storage temperatures and pressures with consequent objectionable great lineal expansion of storage reservoirs due to such changing temperatures and pressures. Thus, it has been necessary to employ a multiplicity of small reservoirs with a corresponding increase in piping, valves etc. having a great and expensive surface area for relatively small storage volume. This system rendered it substantially impossible to either charge or discharge the heat storage reservoirs efficiently owing to the constantly varying temperatures and pressures and the consequent inefficient attempts to adjust turbines to such varying conditions, for turbines are adapted to operate most efficiently at only a definite temperature and pressure.

Another object of the present invention lies in the provision of a generating station having novel storage means adapted to store a maximum amount of heat energy per unit of storage volume, which stored energy is made available at a high and substantially constant temperature and pressure, thereby enabling easy and efficient operation of station units.

The storage means employed consists of huge underground metal lined caverns or reservoirs, one or more of said reservoirs being adapted to store hot water at a substantially constant temperature and pressure, said stored water being rendered available by supplying dry saturated steam to replace the water stored and by evaporating such stored water upon passing through it highly superheated steam. Another or others of said reservoirs are adapted to store highly superheated steam under great pressure, such steam being drawn upon at times of emergency or peak load.

Energy is supplied from the water storage reservoir by the combined method of using this stored water as boiler feed water and by replacing the volume of water so drawn out by an equal volume of dry saturated steam taken from a boiler operating at the storage temperature and pressure. The difference between the quantity of heat in a cubic foot of water and that in a cubic foot of steam which replaces the water represents the available heat taken from storage. At times of peak load, superheated steam is blown from the highly superheated steam reservoir through the hot stored water causing the water to de-superheat the steam thereby being evaporated for use. Such superheated steam in some instances may be supplied directly from boilers instead of from the superheated steam storage reservoir.

Still another object of the present invention is to so construct and arrange the various station turbine units such that they operate at their maximum efficiency while at the same time supplying exhaust steam for heating the water to be furnished to the hot water storage reservoir in a plurality of definitely arranged stages or steps.

Other objects of this invention, not at this time more particularly enumerated, will be clearly understood from the following detailed description of the same.

In carrying out the invention in its preferred form, one or more large hot water reservoirs are provided which are adapted to withstand a very high pressure of the nature of 1400 lbs. per square inch. Turbine generating equipment is provided which is adapted to operate on this high pressure and a boiler or boilers is employed which uses the hot storage water as boiler feed water and is adapted to furnish steam to the reservoir to occupy the space vacated by the feed water. Superheated steam from additional reservoirs may be run into the water storage reservoir upon a drop in pressure therein to reestablish its normal temperature and pressure.

The invention is clearly illustrated in the accompanying drawings, in which:—

Fig. 6 is a typical system load curve carried by a power plant of this invention.

Similar characters of reference are employed in all of the hereinabove described views, to indicate corresponding parts.

Figure 1:
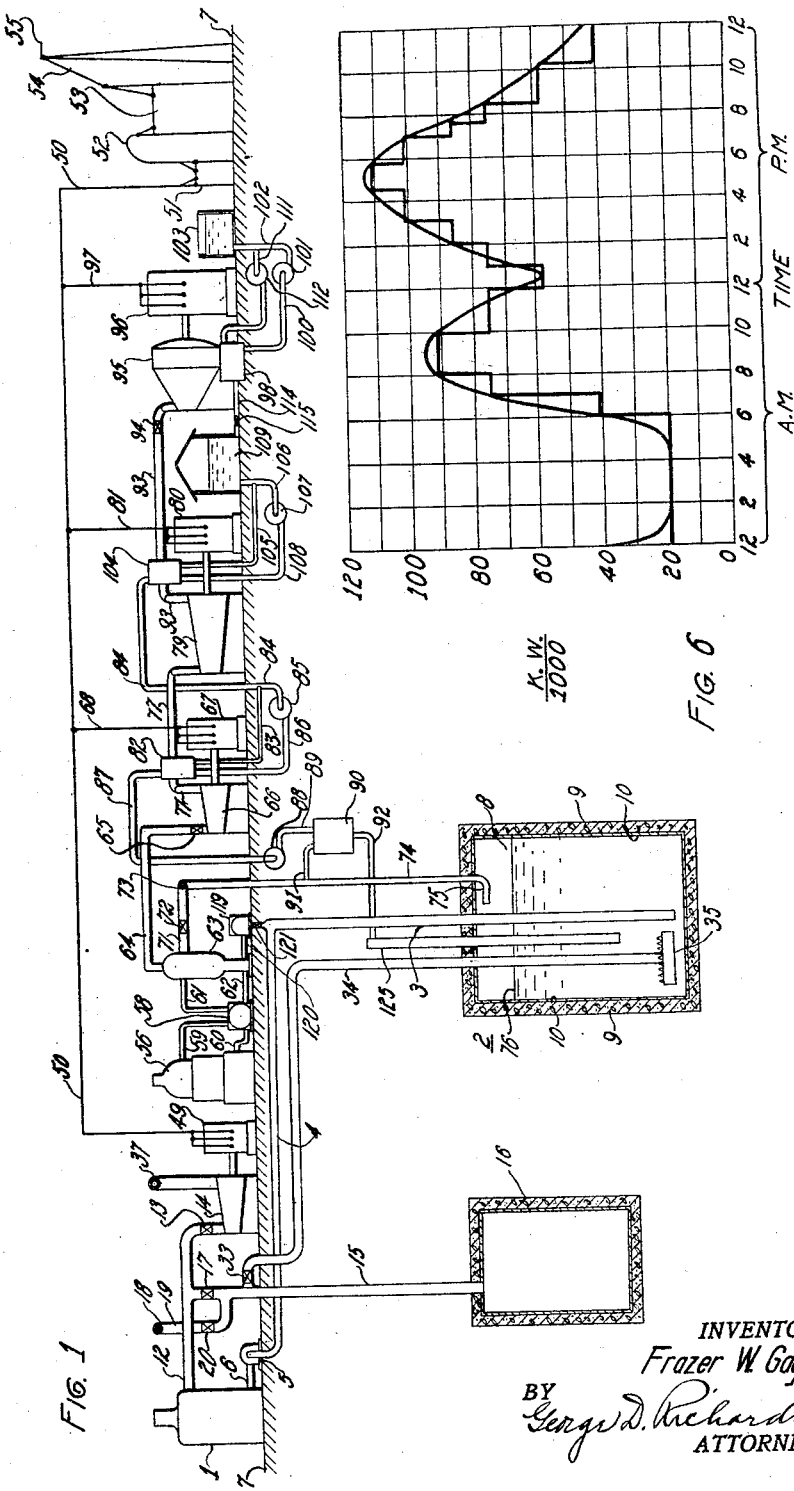
Fig. 1 is a diagrammatic elevational view with parts broken away of the novel electric power generating plant of this invention.
Figure 2:
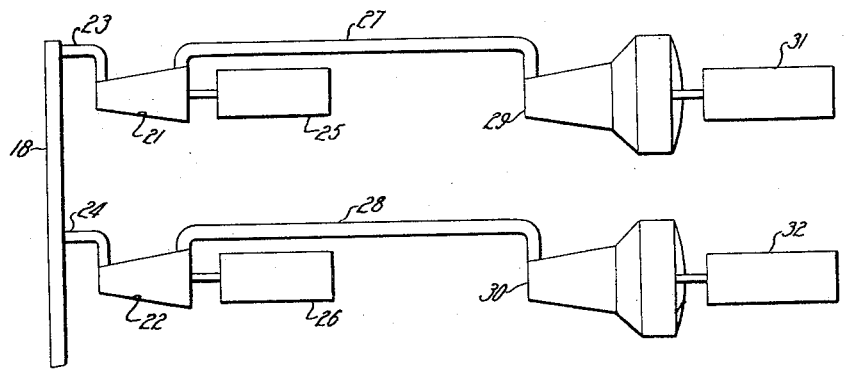
Fig. 2 is a plan view with parts omitted of a portion of a generating plant of this invention.

Referring now to Figs. 1 and 2 of the drawings, the reference numeral 1 designates a very high pressure boiler of the Benson type which is adapted to generate steam at working pressure in excess of 3200 lbs. per square inch. Since the construction of this boiler is well known to those skilled in the art and forms no part of the present invention, it is not shown nor described in detail. Boiler 1 receives its feed water from a hot water reservoir 2 by way of shaft 3, pipe 4, water pump 5, and pipe 6.

Hot water reservoir 2 is normally positioned at a considerable distance below the ground level 7 and comprises an enormous chamber 8 enclosed with concrete walls 9 which are interiorly lined with relatively thin steel plate lining 10. The reservoir 2 is preferably imbedded in bed rock and is adapted to retain hot water at a relatively high and substantially constant pressure of preferably around 1400 lbs. per square inch. The reservoir 2 can retain hot water at this high pressure even though this reservoir has a thin and relatively inexpensive metallic shell 10 owing to the positioning of this reservoir at a considerable depth below the ground surface level and where the surrounding bed rock supports the reservoir against normally bursting pressures. The temperature of this reservoir 2 is also maintained substantially constant continuously.

Boiler 1 is adapted to deliver high pressure superheated steam through pipe 12 and valve 13 to a high pressure turbine 14. A shaft 15 connects with pipe 12 and extends downwardly into the ground to a huge steam storage reservoir 16 which is similar in construction to reservoir 2. A valve 17 is included in shaft 15 and when this valve is opened, high pressure superheated steam flows down into reservoir 16 and is stored therein to be drawn upon when required.

A steam supply main 18 is connected through a riser 19 having a valve 20 therein to the shaft 15. As shown in Fig. 2 the supply main 18 is illustrated as supplying high pressure superheated steam to a pair of turbines 21—22 by way of pipes 23 and 24. The turbines 21—22 are coupled in driving relation to generators 25 and 26. The turbines 21—22 exhaust through pipes 27 and 28 to low pressure turbines 29 and 30. Low pressure turbines 29 and 30 drive generators 31 and 32 respectively.

Figure 3:
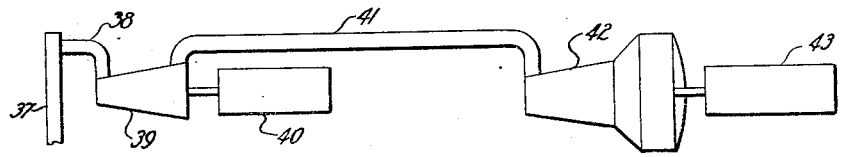
Fig. 3 is a view similar to Fig. 2 of another portion of the power generating plant of this invention.
Figure 4:
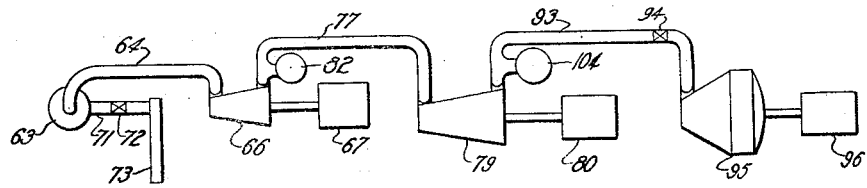
Fig. 4 is a plan view of still another portion of the invention.

The shaft 15 (see Fig. 1) is also connected through piping having a valve 33 therein and a shaft 34 to a nozzle head 35 positioned in the lower portion of a hot water reservoir 2. In the event that the pressure and temperature in hot water reservoir 2 should fall below normal, valve 33 may be opened, thereby causing superheated steam to be blown through nozzle head 35 into the lower portion of reservoir 2, thereby bringing the hot water of this reservoir up to the desired pressure and temperature condition. High pressure turbine 14 exhausts into a supply main 37 which is illustrated in Fig. 3 as connected by a pipe 38 to a turbine 39 driving a generator 40. Turbine 39 exhausts through pipe 41 into a low pressure turbine 42 that is coupled to a generator 43. Turbine 14 drives a generator 49 the output of which is connected by a cable 50 to a circuit breaker 51, constituting one of a row of such circuit breakers. Circuit breaker 51 is connected by a cable 52 to the primary winding of a transformer 53. The secondary winding of transformer 53 is connected by cable 54 to a high tension transmission line 55. Generators 25, 26, 31, 32, 40 and 43 are also connected by cables (not shown) to circuit breaker 51.

One or more furnaces, such as those described in my copending application, Serial No. 354,557, filed April 12, 1929, are preferably employed in this invention for heating metallic alloy which alloy is circulated by suitable pumps through high pressure boilers for producing superheated steam therein. Although only a single such furnace 56 and boiler 63 are illustrated in the drawings, it is to be understood that normally a plurality of these furnaces and boilers would be employed. The metallic alloy heated within furnace 56 is circulated by pump 58 through piping 59 to 62 into the high pressure boiler 63, thereby producing superheated steam in this boiler. It is to be understood that instead of using furnace 56 and boiler 63 for producing superheated steam, any desired boiler may be used for this purpose.

Boiler 63 is connected by a pipe 71 having a valve 72 therein to a supply main 73 which in turn is connected to a shaft 74 that extends down into reservoir 2. Shaft 74 terminates in an elbow 75 which is positioned in the upper part of reservoir 2 and above the hot water level 76 therein. Shaft 74 is adapted to supply saturated steam to boiler or boilers 63 at times when these boilers of themselves fail to deliver the desired rate of flow of superheated steam.

The superheated steam produced in boiler 63 passes through a pipe 64 containing a valve 65 to high pressure turbine 66 driving a generator 67. Generator 67 is connected by jumper cable 68 to cable 50 for supplying electrical energy to transmission line 55. High pressure turbine 66 exhausts through a pipe 77 into a turbine 79 that is coupled in driving relation to a generator 80, the output of which is conducted by jumper cable 81 to the cable line 50.

A high pressure feed water heater 82 of the tubular type is connected to pipe 77. Condensate formed in feed water heater 82 flows through drain pipe 83 into a pipe 84 connected to the intake of a feed water pump 85. Pump 85 delivers feed water through pipe 86, feed water heater 82 and pipe 87 to the intake of a feed water pump 88. Pump 88 delivers this feed water through a pipe 89 to a feed water heater 90 illustrated as of the jet type. Steam is supplied to feed water heater 90 from shaft 74 by way of pipe 91 and condensed steam together with the heated feed water pass through pipe 92 into pipe 125 and from thence into the bottom of reservoir 2, thereby replenishing the hot water therein.

Turbine 79 exhausts through pipe 93 having a valve 94 therein into a low pressure turbine 95. A low pressure feed water heater 104 of the tubular type is connected to pipe 93. Steam condensed in a heater 104 flows through drain pipe 105 into a pipe 106 connected to the intake of a feed water pump 107. Pump 107 delivers feed water through a pipe 108 and feed water heater 104 to pipe 84. Pipe 106 connects to the hot well 109. Turbine 95 is coupled to a generator 96 the output leads of which are connected by a jumper cable 97 to the cable line 50. The fully expanded steam leaving turbine 95 passes into a condenser 98 where it is condensed by circulating water in a manner well known to those skilled in the art. The condensed steam collecting in condenser 98 flows into a pipe 100 and is conducted to the intake of a circulating pump 101 which delivers this condensate through a pipe 102 to a cold well 103. A pipe 111 connects with pipe 102 and is adapted during certain light load periods to convey cool water from cold well 103 to the intake of a feed water pump 112. Pump 112 delivers this water through pipe 113 into the cooling chambers of the condenser 98 from whence it flows through a pipe 114 having a valve 115 therein into hot well 109. During these light load periods, the cool condensate from cold well 103 serves to condense the steam leaving turbine 95, thereby causing this turbine to work under a high back pressure since the cold well water would ordinarily be at a temperature of about 70° Fahrenheit.

Figure 5:
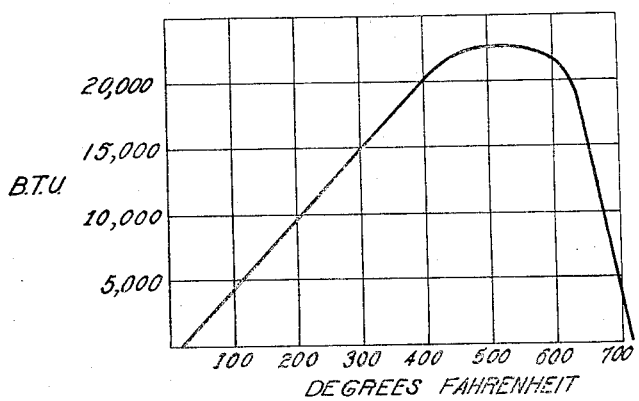
Fig. 5 is a graph showing the difference between the amount of heat in a cubic foot of water and that in a cubic foot of steam at certain temperatures.

In Fig. 5 there is illustrated a curve showing the difference between the amount of heat in B. t. u. in a cubic foot of water and in a cubic foot of dry saturated steam of the same temperature. It will be noted that the difference is a maximum between the values of 450° F. and 600° F. and the curve shows that a cubic foot of water within this temperature range has over 20,000 B. t. u. more heat therein than in a cubic foot of dry saturated steam. During operation of the novel generating plant of this invention, the hot water stored within reservoir 2 is maintained at a temperature within this temperature range of 450° to 600° and preferably close to the latter temperature. At just under 600° F. a cubic foot of water has a pressure of 1400 lbs. per square inch and weighs approximately 42.5 lbs. and stores approximately 590 B. t. u. per pound (i. e. above the 32° F. point) or a total of approximately 25,000 B. t. u. When superheated steam from reservoir 16 is passed through this water, each pound as it evaporates absorbs approximately 580 B. t. u. of superheat. A cubic foot of such hot water will thus absorb approximately 24,500 B. t. u. of superheat in flashing into steam and there will remain in reservoir 2 a cubic foot of dry saturated steam in lieu of the water displaced at 1400 lbs. per square inch, which cubic foot of steam will contain approximately 4,000 B. t. u. It results therefore, that superheated steam in passing through reservoir 2 from reservoir 16 by way of nozzle-head 35 will give up superheat and volatilize the hot water therein, and for each cubic foot of water so volatilized approximately 25,000 — 4,000 = 21,000 B. t. u. of heat energy will be taken from the hot water storage in reservoir 2 and passed on by way of shaft 74 to boilers 63 as desired during periods of heavy load.

Fig. 6 illustrates a 24 hour load curve for a typical utility system which the novel generating plant of this invention is adapted to supply without outside aid. It will be noted that during the early morning hours from 12 to 6 a. m. the system load is a minimum at 20,000 K. W. and that at 6 a. m. the load rises to approximately 40,000 K. W. By 7 a. m. the load is 76,000 K. W. Between 8 and 10 the load has risen to 91,000 K. W. and between 10 and 12 it drops to 58,000 K. W. From 1 p. m. to 6 p. m. the load rises in successive steps of approximately 76,000 K. W., 86,000 K. W., 101,000 K. W. to a peak of 116,000 K. W. and the load thereafter again falls off as shown in this figure.

In operation, boilers 1 and 63 and turbines 66 and 79 are adapted to operate continuously at their rated capacities and hence at maximum efficiency. During the period of minimum system load from 12 to 6 a. m. the power plant is operated so as to store a maximum quantity of heat energy. During this period substantially all of the steam from boilers 63 (preferably at 1400 lbs. per square inch pressure) will be taken from the high pressure turbine stages to heat feed water in feed water heaters 82, 104 and steam may be taken directly by way of pipe 71, shaft 74 and pipe 91 to heat feed water in heater 90. During this period turbines 66 and 79 alone will be running, the valve 94 being closed so that turbine 95 is idle. Pump 107 will pump a large quantity of feed water at approximately 180° F. from hot well 109 through feed water heater 104 where this water will be heated to substantially the exhaust temperature of turbine 79 or 300° F. From feed water heater 104 this feed water passes through pipe 84 and is forced by pump 85 through heater 82 in which heater the water temperature is raised to that of the exhaust of turbine 66 or approximately 425° F. From heater 82, the feed water passes through pipe 87 to pump 88 which drives this feed water through heater 90 wherein its temperature is raised to nearly 600° F. or that of the hot water reservoir 2. From heater 90 the feed water drains by way of pipe 92 and pipe 125 into reservoir 2.

Normally a plurality of duplicate units comprising boilers 63 and connected turbines 66, 79 and 95 would be utilized, in which case the feed water may be passed through a greater number of stages during its heating as from the feed water heater 104 of one stage of one boiler unit to a heater 104 of the corresponding stage of a second boiler unit and so on to the last of such units, whereupon it will be passed back successively through the feed water heaters 82 of the higher turbine stages. Or the feed water after passing through the two stages of one boiler unit may pass through the higher stages of other boiler units and etc.

Thus, in accordance with this invention the feed water is heated in a plurality of stages or steps to the temperature of the hot water reservoir during the minimum load period. During this period turbo-generators 66—67 and 79—80 will carry the entire station load and boiler 1 will deliver all of its steam at approximately 3200 lbs. per square inch to the superheated steam storage reservoir 16 by way of pipe 12 and stack 15, valves 20 and 33 being closed. If pressure should tend to fall in hot water storage reservoir 2, valve 33 may be opened and superheated steam delivered to reservoir 2 by way of pipe 34 and nozzle-head 35.

As the system load increases between 6 and 7 a. m. pumps 107, 85 and 88 will be slowed down until they handle substantially only one-half of the amount of feed water previously handled, thereby causing the output of turbo-generator 79—80 to increase so as to carry a greater load and turbine 95 is started by opening valve 94.

As the system load increases further between 7 and 8 a. m. the feed water pumps 85, 107 and 88 are shut down and with valve 94 open, the exhaust steam from turbine 79 drives low pressure turbine 95 at full load. Feed water pump 112 is operated to pump cool condensate from cold well 103 through the cooling chambers of condenser 98 and through pipe 114 into hot well 109. This condensate from cold well 103 serves to condense the steam leaving turbine 95 and when this condensate enters hot well 109 it will be at a temperature somewhat less than the boiling temperature of water at zero gauge or about 180° F. Upon a further increase in load, valve 13 is opened causing turbine 14 to operate and the exhaust from this turbine will pass through main 37 to turbine 39 and from thence through turbine 42 effecting the operation of generators 49, 40 and 43. During this period all turbo-generators operating are run at their rated economical load.

As the load again decreases between 10 a. m. and 1 p. m. the above cycle of operations is reversed in part. From 1 o'clock on, the load again increases and turbines 14, 39 and 42 are again put in service. As the load approaches its peak valve around 5 o'clock the valve 20 is opened causing the stored superheated steam from storage reservoir 16 to flow through shaft 15, pipes 19 and 18 to high pressure turbines 21 and 22 which drive generatores 25 and 26. Exhaust steam from turbines 21 and 22 operates turbines 29 and 30, thereby driving generators 31 and 32 all of which generators supply electrical energy to the transmission line 55. As the system load again drops off after 6 p. m. the cycle is again reversed.

It will be noted that the boiler equipment of the novel power plant of this invention operates continuously at constant load and any portion of the steam generated which is not immediately consumed is put into heat storage either directly in the superheated steam reservoir 16 or indirectly in the hot water reservoir 2 by heating feed water in heaters 82, 104, 98 and 90. Owing to the constant load operation of the boilers, a great saving in unit installation costs is made since it is not necessary to install variable speed fans and other auxiliary equipment ordinarily required to adjust the boilers to variable loads. Also, all parts are designed and adjusted to give maximum efficiency at the normal operating point. Increased economy is obtained by furnishing all boiler feed water from reservoir 2. Boilers 1 are supplied with feed water by way of shaft 3, pipe 4, pump 5 and pipe 6, whereas boilers 63 are supplied from shaft 3 by way of pipe 118, having valve 121 therein, deep well pump 119 and pipe 120.

Turbo-generators 66—67 and 79—80 which operate continuously, are designed for maximum efficiency at relatively great cost while the remaining turbo-generators which run only part time may be designed for a slightly lower efficiency at a great saving in cost per unit capacity.

A great saving in fixed charges against unit capacity is obtained owing to the inherent ability of the boiler installation of this invention together with its associated heat storage to supply a system load with substantially twice the amount of peak energy that may be taken from ordinary power plant installations.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:—

1. An electric power generating plant for supplying a variable system load comprising, steam boilers operating continuously at constant load, steam storage means connected to one of said boilers for storing steam during light load periods, turbo-generators also connected to said boiler and to said steam storage means for operating during heavy load periods, turbo-generators connected to another of said boilers and operating continuously, said last named turbo-generators consuming a portion of the energy output of said second named boiler, and heat storage means arranged to store unused portions of the energy output of said second named boiler for use during heavy load periods.

2. An electric power generating plant for supplying a variable system load comprising, boilers operating continuously at full load, turbo-generators, a hot water storage reservoir, feed water heaters operating to utilize a portion of the output of said boilers during light system load periods to heat water to boiler temperature and pressure for storage in said hot water storage reservoir and means for forcing superheated steam through said stored water for evaporating said stored water for the use of said turbines during heavy load periods.

3. An electric power generating plant for supplying a variable system load comprising, boilers operating continuously at full load, turbo-generators, a hot water storage reservoir, feed water heaters operating to utilize a portion of the output of said boilers during light system load periods to heat water to boiler temperature and pressure for storage in said hot water storage reservoir and means for evaporating said stored water for the use of said turbines during heavy load periods, and additional means acting to maintain the temperature and pressure of the hot water within said reservoir substantially equal to that within said boilers.

4. An electric power generating plant for supplying a variable system load comprising, boilers operating continuously at full load, turbo-generators, a hot water storage reservoir, feed water heaters operating to utilize a portion of the output of said boilers during light system load periods to heat water to boiler temperature and pressure for storage in said hot water storage reservoir and means operating to force superheated steam through said stored water during heavy load periods to evaporate the latter for use of said turbines.

5. The method of operating an electric power generating plant having a superheated steam storage reservoir, a boiler, and turbo-generators connected thereto and to said storage reservoir comprising supplying turbo-generators with superheated steam from said storage reservoir during peak load periods, operating said boiler continuously at substantially constant output under varying turbo-generator demand, and using the excess output of said boiler not consumed by said turbo-generators for storing superheated steam in said reservoir.

6. The method of operating an electric power generating plant having a superheated steam storage reservoir, a hot water storage reservoir, boilers and turbo-generators connected thereto, comprising supplying turbo-generators with superheated steam from said steam storage reservoir during peak loads, furnishing said boilers with hot feed water from said hot water storage reservoir, operating said boilers continuously at substantially constant output under varying turbo-generator demand and using the excess output of said boilers not taken by said turbo-generators for heating said feed water to be supplied to said hot feed water storage reservoir and for replenishing superheated steam in said superheated steam storage reservoir.

7. The method of operating an electric power generating plant having a superheated steam storage reservoir, a hot water storage reservoir, boilers and turbo-generators connected thereto, comprising supplying turbo-generators with superheated steam from said steam storage reservoir during peak loads, furnishing said boilers with hot feed water from said hot water storage reservoir, operating said boilers continuously at substantially constant output under varying turbo-generator demand and using the excess output of said boilers not taken by said turbo-generators for heating said feed water to be supplied to said hot feed water storage reservoir and for replenishing superheated steam in said superheated steam storage reservoir, the hot water in said feed water storage reservoir being maintained at substantially constant temperature and pressure.

In testimony, that I claim the invention set forth above I have hereunto set my hand this 22nd day of October 1929.

FRAZER W. GAY.